United States Patent [19]

Bindra et al.

[11] Patent Number: 4,457,986

[45] Date of Patent: Jul. 3, 1984

[54] USE OF UNDERPOTENTIAL DEPOSITED LAYERS OF METALS ON FOREIGN METAL SUBSTRATES AS CATALYSTS FOR ELECTROLYTIC CELLS

[75] Inventors: Perminder S. Bindra, Ossining; Allan P. David, Binghamton; David N. Light, Putnam Valley, all of N.Y.

[73] Assignee: International Business Machines Corporation, Armonk, N.Y.

[21] Appl. No.: 454,746

[22] Filed: Dec. 30, 1982

[51] Int. Cl.³ .................. H01M 4/92; H01M 8/08
[52] U.S. Cl. ............................. 429/40; 429/44; 429/46
[58] Field of Search ............... 429/44, 40, 46; 252/466, 460, 463, 461, 466 PT, 472

[56] References Cited

U.S. PATENT DOCUMENTS

| | | | |
|---|---|---|---|
| 3,414,439 | 12/1968 | Adlhart | 429/44 X |
| 3,438,815 | 4/1969 | Giner | 429/44 X |
| 3,444,003 | 5/1969 | Moser | 429/40 |
| 3,506,494 | 4/1970 | Adlhart | 429/44 X |
| 3,854,994 | 12/1974 | Binder | 429/40 X |
| 4,127,468 | 11/1978 | Alfenaar et al. | 429/44 X |
| 4,186,110 | 1/1980 | Jalan | 429/44 X |
| 4,192,907 | 3/1980 | Jalan et al. | 429/44 X |
| 4,373,014 | 2/1983 | Landsman et al. | 429/44 X |

*Primary Examiner*—Anthony Skapars
*Attorney, Agent, or Firm*—Graham S. Jones, III

[57] ABSTRACT

Fuel cell catalysts which are efficient, long-lived, and refurbishable in-situ include gold carrying a UPD deposit of another element. UPD Ag, Pt, Pd, Ir, Rh or Tl, Pb and Bi on Au crystallites are carried on and bonded to another substrate. The crystallites cause dissociative adsorption of the oxygen molecules so that four electrons are produced per molecule during the reduction reaction which is involved. In an alkaline electrolyte, the catalyst metals such as Pd, Ir, Ag, Rh and Pt show no tendency to poison the counter electrode (counter relative to the other electrode) since each of those metals is a good catalyst for both electrodes. Suitable fuels include methanol ($CH_3OH$), formaldehyde (HCHO), and formic acid (HCOOH).

20 Claims, 7 Drawing Figures

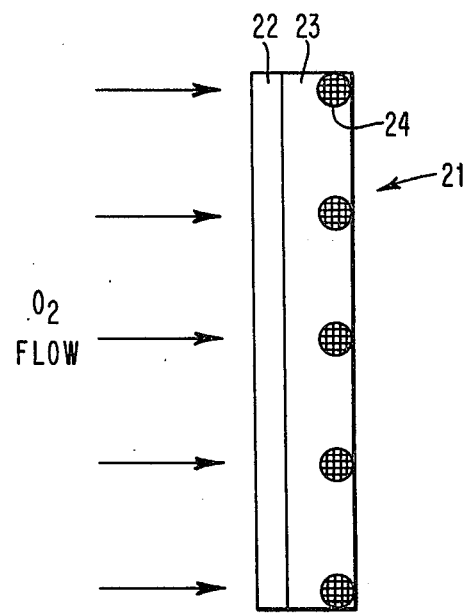
FIG. 1.1
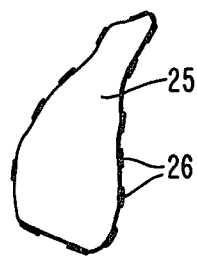
FIG. 1.2
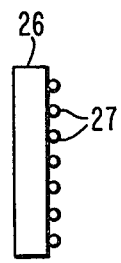
FIG. 1.3

USE OF UNDERPOTENTIAL DEPOSITED LAYERS OF METALS ON FOREIGN METAL SUBSTRATES AS CATALYSTS FOR ELECTROLYTIC CELLS

BACKGROUND OF THE INVENTION

1. Field of the Invention

The present invention relates to electrolytic cells and more particularly to systems such as fuel cells, batteries, industrial electrolysis equipment and the like.

2. Description of the Prior Art

U.S. Pat. No. 4,192,907 of Jalan et al for "Electrochemical Cell Electrodes Incorporating Noble Metal - Base Metal Alloy Catalysts" suggests a fuel cell with a substrate of an electrically conductive material coated with a platinum base alloy. Preferably the alloy is coated on a substrate comprising conductive particles of carbon. This electrode deteriorates because of the segregation of the component elements in the alloy on the surface of the alloy with small clusters of each of the elements from the alloy forming on the surface of the alloy. Whereas Pt alone is a catalyst, the refractory metal added by Jalan et al to the Pt to form the alloy is ineffective (when isolated into islands or when in the bulk form) as a catalyst. That is, the refractory metal affords little or no catalytic activity. In addition, the Jalan et al alloy would be less expensive than Pt alone which is an important reason for trying to use it, but its life would not be extended beyond the life of Pt because of segregation and impurities. The impurities referred to are unwanted species deposited on the catalyst from the bath.

It is known that a layer deposited at an underpotential referred to hereinafter as an underpotential deposited layer alters the electronic properties of the deposited metal making it more noble than the bulk metal, based on material published in a review article written by D. M. Kolb, published in Advances in Electrochemistry and Electrochemical Engineering, Vol. 11, Gerischer and Tobias, Eds., Interscience (1977), 125–271, especially pages 234–239. There was no suggestion that the subject matter of the article could be used as a catalyst in the way described in this application.

Lead has been deposited on gold by underpotential deposition as described by McIntyre, et al, "Electrochemical Catalysis by Foreign Metal Adatoms", Abstract 339, Electrochemical Society pages 864–5 (1979). However, this was not done in connection with a catalyst for an electrolytic cell.

Copper was employed on gold in an alkaline solution, as described in Amadelli, Bindra, Khutornoi and Yeager, "Influence of Metal Ions on the 02 Reduction of Noble Metals in Alkaline Solutions", Extended Abstracts of the ECS Spring Meeting, (1979) Boston, Mass.

Recent advances in the search for new oxygen reduction electrocatalysts has led to the use of UPD monolayers of metals deposited at an underpotential to produce electrocatalytic surfaces of substantially enhanced activity and stability. See Khutornoi et al supra, and McIntyre et al supra. Formation of a UPD layer alters both the geometric structure of the surface as well as the electronic properties of the deposited metal rendering it more noble than the bulk metal. See Kolb et al supra. The electronic properties of the deposited metal are often quite specific to the UPD layer in combination with a specific substrate. Thus these modified electrodes also provide rather convenient and useful model systems for studying the correlations between the catalytic behavior and the surface electronic and geometric structure.

The electrocatalytic activity of several UPD systems for the reduction of oxygen gas in alkaline and acid media has been examined by McIntyre et al supra and the work of Amadelli, Molla, Bindra, and Yeager, J. Electrochem. Soc., supra, in the alkaline case; and Bindra, Clouser et al in the acid case. There is an apparent anomaly in the behavior of the UPD layers in the two media. In an alkaline solution, the diffusion limiting current for oxygen reduction on gold in the presence of UPD layers of metals such as Tl, Pb (McIntyre et al supra) and copper (Amadelli et al supra) is almost doubled, indicating a favoring of the four electron reduction. Where there is an electrode surface of gold covered with a UPD layer of a catalytic metal, the result is that the equation of the chemical reaction involved is as follows:

$$O_2 + 2H_2O + 4e^- \rightarrow 4OH^-$$

In the case of a surface of a metal such as gold in bulk form, in the absence of the UPD species the result is that the chemical reaction is different as follows:

$$O_2 + H_2O + 2e^- \rightarrow HO_2^- + OH^-$$

The net effect of this is that we have observed that twice as much power can be realized per oxygen molecule.

Even on Pt substrates, oxygen reduction current in alkaline solution has been shown to increase in the presence of trace quantities of Tl positive ions in the electrolyte as described by Amadelli, Bindra, and Yeager, supra.

In acid media, on the other hand, the UPD of copper seems to lower the catalytic activity of Pt for oxygen reduction as described in Bindra, Clouser et al supra. In an effort to understand the anomalous behavior the catalytic effects of UPD layers on oxygen reduction have been examined in weakly acidic, neutral, and alkaline electrolyte.

Lead has been deposited on mercury or gold in a neutral medium (pH of about 7) in the form of a UPD layer of lead on mercury and lead on gold in a paper by Bindra, "The Effect of pH on the Electrocatalytic Properties of Adsorbed Metal Ions", Journal of the Electrochemical Society (submitted 1982).

Lead or thallium on gold has been published by Amadelli et al "Influence of Metal Ions on the 02 Reduction of Noble Metals in Alkaline Solutions", Journal of the Electrochemical Society, Vol. 128, No. 12, pages 2706–2709 (December 1981).

This invention is believed to differ from the prior art in that it has several novel features.

Firstly, the system of this invention utilizing an element selected from the groups consisting of:

(a) Pt, Ir, Pd, Ag, or Rh as a catalyst in alkaline media and to control impurities in any media, or (b) Pb, Tl or Bi as a catalyst in alkaline media or as a means to control impurities in acid media on thin crystallites of Au. They are distinguished from the above systems in that the substrate is particulate and some of the adsorbates are noble metals. In the above systems the adsorbate is a base metal such as lead.

Another aspect of this invention resides in the novel feature of using a catalyst such as Pt rather than Pb where the Pb would poison one of the electrodes in the electrochemical system. That statement is qualified by the fact that a diaphragm between electrodes in the system could be used to avoid poisoning, but that the cost of such a solution would be reduced voltage. It should be understood that as a catalyst alone, Pb is effective in those cases in which it would not tend to poison the electrodes.

Secondly, small crystallites of gold and a monolayer of a UPD catalyst metal in solution provides (a) a high surface area, (b) the UPD layer can stay only on the surface of the substrate metal (gold) since the substrate metal is too thin or not bulky enough for the catalyst layer to diffuse into the bulk (i.e., thick film metal).

Thirdly, UPD metal catalysts in this environment control the buildup of impurities on the surface of the catalyst which is not described in any of the above references. Here we refer to metals such as Pt, Pd, Ag, Rh, Ir, as well as Pb, Tl, and Bi in the case of acid media (electrolytes).

SUMMARY OF THE INVENTION

In accordance with this invention, the problems of limited lifetime of the catalyst caused by loss of catalyst coupled with reduction of economic viability of the system are dealt with.

It is desired to form superior fuel cell catalysts which are efficient, long-lived, and refurbishable in-situ.

In addition, it is an object of this invention to achieve greater output efficiency or power for a given input of fuel.

We have discovered that the presence of UPD Ag, Pt, Pd, Ir, Rh on Au crystallites carried on and bonded to another substrate causes dissociative adsorption of the oxygen molecules so that four electrons are produced per molecule during the reduction reaction which is involved. This is superior to the gold surface which fails to dissociate the oxygen molecules, so that only two electrons are realized per oxygen molecule. In addition, for an alkaline electrolyte, the catalyst metals such as Pd, Ir, Ag, Rh and Pt show no tendency to poison the counter electrode (counter relative to the other electrode) since each of those metals is a good catalyst for both electrodes. In contrast we have found that Pb on Au poisons the hydrogen electrode.

The oxygen gas molecule undergoes dissociative adsorption on the surface of the catalyst. Oxygen is reduced to hydroxyl ions and in the absence of the UPD monolayer, the oxygen and water are converted to hydrogen peroxide.

The above-described systems can operate with several different fuels. They include use of methanol ($CH_3OH$), formaldehyde (HCHO), and formic acid (HCOOH).

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 1.1 shows an electrode in accordance with this invention in the form of a support for numerous microscopic carbon particles each of which carries a plurality of smaller gold crystallites in the form of tiny islands.

FIG. 1.2 shows a single particle of carbon from FIG. 1.1 enlarged in size with the crystallites of gold seen on the surface.

FIG. 1.3 shows a single crystallite of gold from FIG. 1.2 with a monolayer of a catalyst metal deposited on the surface of the gold crystallite in accordance with this invention.

In the drawings, like elements are designated with similar reference numbers, and identical elements in different specific embodiments are designated by identical reference numbers.

DESCRIPTION OF THE PREFERRED EMBODIMENT

Figure 2:
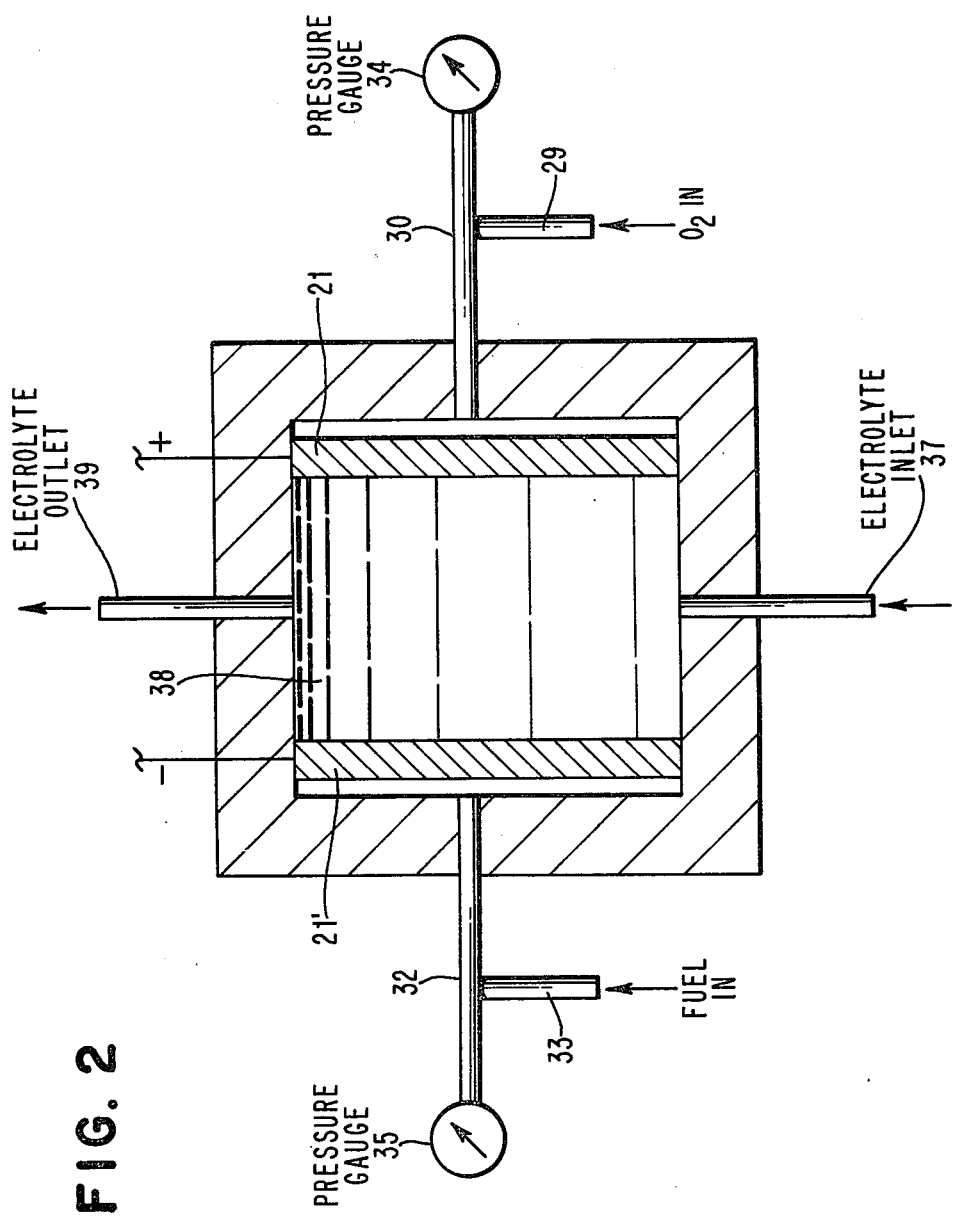
FIG. 2 shows a fuel cell incorporating a porous electrode of the variety shown in FIGS. 1.1-1.3.

FIG. 1.1 shows a support for a set of carbon particles 23 each of which carries numerous small gold islands upon which are deposited a monolayer of the catalyst particles of this invention as will be described in detail below in connection with FIG. 1.2. FIG. 1.1 shows a stationary porous, gas fed, carbon and metal screen electrode 21 which can be employed as a working electrode in an electrolytic cell in accordance with this invention. The porous electrode 21 is shown with a porous substrate 22 of Teflon polytetrafluoroethylene which carries an amalgam of small compressed carbon particles 23 supported upon a matrix of metallic wires 24 which are woven into a screen. Wires 24 are composed of a metal such as nickel. The wires 24 connect to a lead of a DC source (as described in U.S. patent application Ser. No. 443,328 filed Oct. 7, 1982 of Perminder Bindra and David N. Light, filed Oct. 7, 1982 and entitled "Article and Method of Manufacture Employing Electrochemically Dispersed Platinum Catalysts Deposited on a Substrate" to provide an attractive force to the metallic gold ions in an electrolyte 9 in FIG. 3, which causes them to be deposited on the myriad surfaces of the carbon particles 23 both on the interior and the exterior of the electrode 21. Prior to application of chemical deposition pulses from a programmer, the electrolyte which preferably comprises as follows:

8 g/l $KAu(CN)_2$ (0.277 M)
120 g/l $K_2HPO_4$ (0.69 M)
30 g/l $KH_2PO_4$ (0.22 M)
pH=7.5

The solution carries ions of the gold to deposit to form the gold islands. Prior to deposition of the gold islands on the carbon, the electrolyte is permitted to diffuse within the porous electrode 21, which is adapted to be used as an electrode in a fuel cell or another form of electrochemical cell. Porous electrode 21 is suitable for use as a gas fed electrode such as those shown in FIGS. 2 and 4, where gas is fed through electrode 21 or 64 respectively into the electrolyte 38 or 65 respectively. The electrolytes in those systems comprise NaOH or KOH plus a small concentration of the catalyst metal ions of this invention.

FIG. 1.2 shows a particle 25 of carbon 23 enlarged from a microscopic size which has been plated with numerous small crystallites 26 of gold forming the myriad substrates upon which the catalyst metal can deposit the monolayers or submonolayers of this invention. Crystallites 26 are spread widely over the surface of each microscopic carbon particle 25. The crystallites 26 are about 5-10 nm in diameter and about two to ten atomic layers thick giving surface areas of about 100 square meters per gram.

FIG. 1.3 shows a single crystallite 26 of gold coated with a monolayer 27 of a catalyst metal in accordance with this invention comprising a metal such as platinum, silver, palladium, iridium, or rhodium.

FIG. 2 shows a fuel cell incorporating the porous electrode 21 of FIG. 1.1. FIG. 2 shows an oxygen-hydrogen fuel cell which incorporates a set of porous gas fed electrodes 21 and 21', and gas source 33 of hydrogen in the case of cathode electrode 21' which passes through line 32 to electrode 21'. Oxygen passes through line 30 from source 29 to electrode 21, and its pressure is measured by gauge 34. The fuel such as hydrogen, formic acid, methanol or formaldehyde passes through from source 33 to input line 32 to the electrode 21' and pressure is measured by the gauge 35. The electrolyte (which may contain NaOH or KOH solution) and the catalyst metal in accordance with this invention may also carry the above fuels in line 37 (in which case line 32 can be eliminated) is introduced via electrolyte inlet line 37 into the electrolyte chamber 38 which holds the alkaline electrolyte employed in accordance with this invention.

Figure 3:
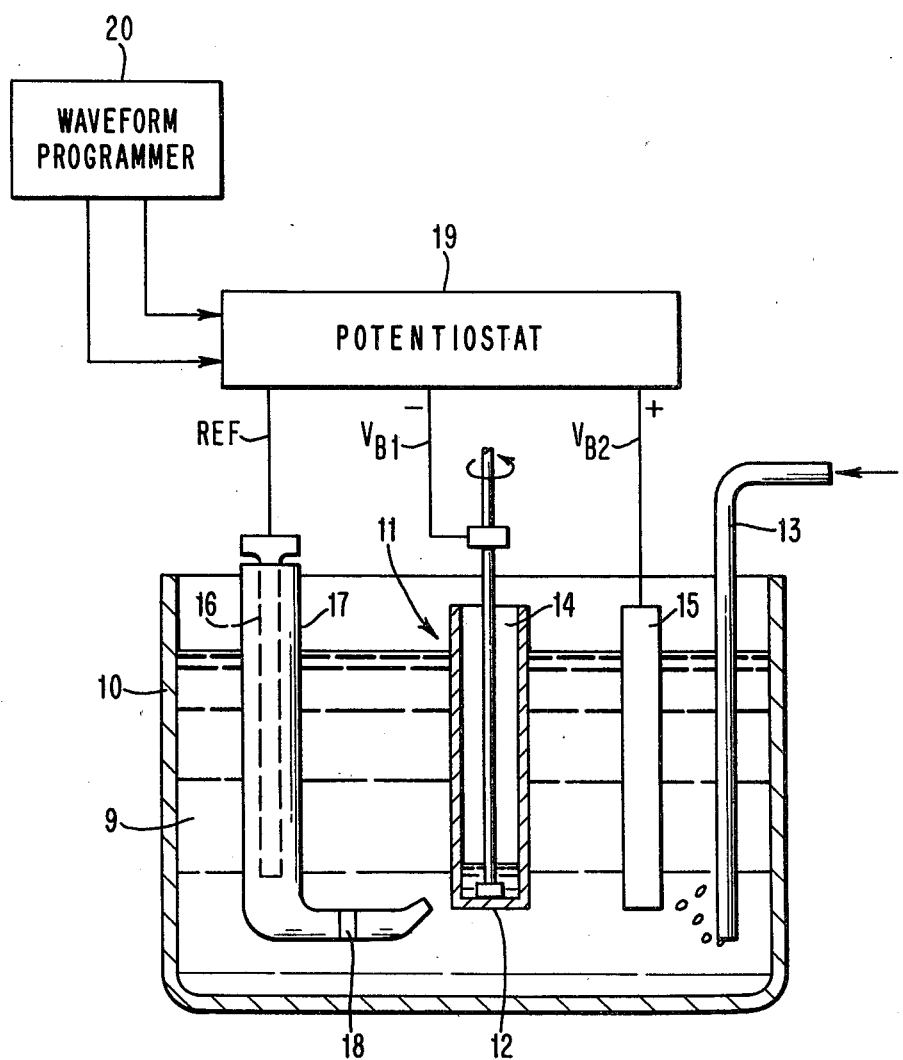
FIG. 3 shows an experimental electrochemical system for testing the efficacy of the instant invention.

FIG. 3 shows an experimental system which can be employed for the purpose of testing the efficacy of the instant invention in a particular embodiment. The apparatus of FIG. 3 includes a glass cell wall 10 for performing measurements under conditions of controlled mass transport with the rotating disk technique. This system is described in some detail in copending U.S. patent application Ser. No. 443,328 filed Oct. 7, 1982 of P. Bindra et al for "Article and Method of Manufacture Employing Electrochemically Dispersed Platinum Catalysts Deposited on a Substrate", filed Oct. 7, 1982.

The teaching thereof is incorporated herein by reference.

Fabrication of the rotating disk electrodes was described in the Randin, et al article cited in the Bindra, et al application. After fabrication, the ordinary pyrolytic graphite electrode 12 serving as a working electrode was polished nearly to a mirror finish, as described in Bindra, et al. The counter electrode 15 was composed of platinum foil and the reference electrode 16 was a saturated calomel electrode (SCE). The electrochemical cell used was a standard laboratory type with a separate compartment 17 for the reference electrode 16. The reference electrode is separated from the working electrode compartment 10 by a frit 18. Potentiostat 19 powers the electrodes with a waveform programmer 20.

Tubes 13 supply a gas to the system which will be oxygen in the case of hydrogen-oxygen fuel cells and will be nitrogen gas when using carbonaceous fuels. The electrolyte solution 9 comprises one to ten MOLES/liter of NaOH or KOH as the basic electrolyte with 1/100,000 MOLES/liter of platinum as the catalytic metal. When using carbonaceous fuels, the solutions are deoxygenated prior to taking measurements. No oxygen is supplied at inlet 13. Potential control of the working electrode is achieved with the potentiostat 19. The catalytic activity of a particular system, e.g., Pt/Au is determined by obtaining polarization curves, for say oxygen gas reduction when oxygen gas is the fuel and for the anodic oxidation of carbonaceous fuels.

Figure 4:
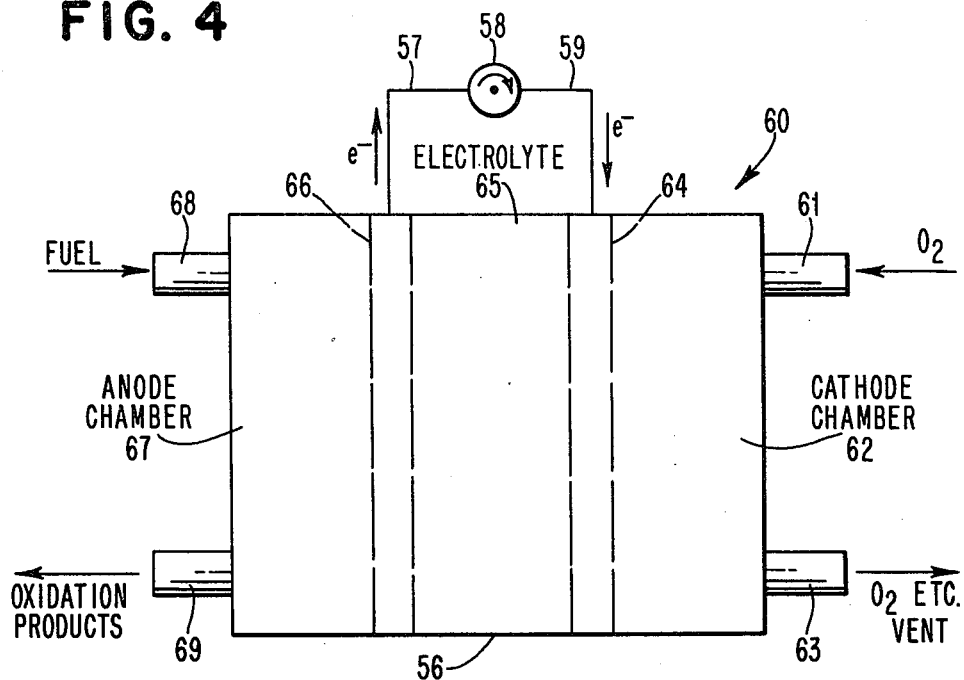
FIG. 4 shows another form of fuel cell adapted for use in accordance with this invention, with an electrolyte chamber between two chambers for oxygen and fuel respectively.

FIG. 4 shows another fuel cell in accordance with this invention which is taken from copending U.S. patent application Ser. No. 394,013 of Bindra for "Fuel Cells and Metal-Air Batteries with Alkaline Electrolytes" which is commonly assigned. The teachings of that application are incorporated herein by reference. The fuel cell 60 includes a cathode chamber 62 for oxygen gas supplied at inlet 61 and exhausted from chamber 62 at vent 63. The cathode 64 forms the left wall of the cathode chamber 62 and the oxygen gas can pass from the chamber 62 through the porous cathode 64 into the electrolyte chamber 65 which houses the liquid electrolyte which comprises NaOH or KOH solution as above. Preferably, means are provided for refreshing the electrolyte by means such as those shown in connection with FIG. 2. The electrolyte in chamber 65 contacts the inner wall of cathode 64. As in FIG. 1.1, the cathode 64 is a thin flat sheet of a porous material such as compressed graphite or RB carbon. The electrolyte comprises an alkaline aqueous solution such as NaOH or KOH.

Preferably, 10-4 or 10-5 moles of ions of the UPD species is added to the electrolyte.

A porous electrode 66 forms the other wall of the electrolyte chamber 65 on the opposite side of chamber 65 from the cathode 64. Anode 66 is also preferably metallic and dimensionally stable. The lower surface of the electrolyte chamber 65 is provided by base 56 which is composed of a non-corrosive material as in the copending application of Bindra. The other surface of the anode 66 defines a wall of another chamber comprising the anode chamber 67. Chamber 67 receives a fuel supply via inlet 68 selected from the group consisting of hydrocarbons, e.g., alcohols such as methanol; aldehydes such as formaldehyde; acids such as formic acid; and hydrogen. The fuels are dissolved in a solution of NaOH or KOH of 1-10 moles/liter and 1 to 2 moles of fuel per liter in either the gaseous or the liquid form. Fuel is supplied at inlet 68 to chamber 67. Exhaust products consisting of $CO_2$, $H_2O$ and other byproducts of the oxidation-reduction process are exhausted from chamber 67 by line 69. A pump drives the fluids from inlet 68 into chamber 67 and out through outlet 69.

The catalyst of FIG. 1.3 is located within the cathode 64. The catalyst reduces the O2 which combines with $H_2O$ to form negative $OH^-$ ions or radicals. The gold islands are coated with the monolayers or submonolayers of Pt, Pd, Ag, Rh or Ir which operate to enhance the operation of the fuel cell in accordance with this invention.

Figure 5:
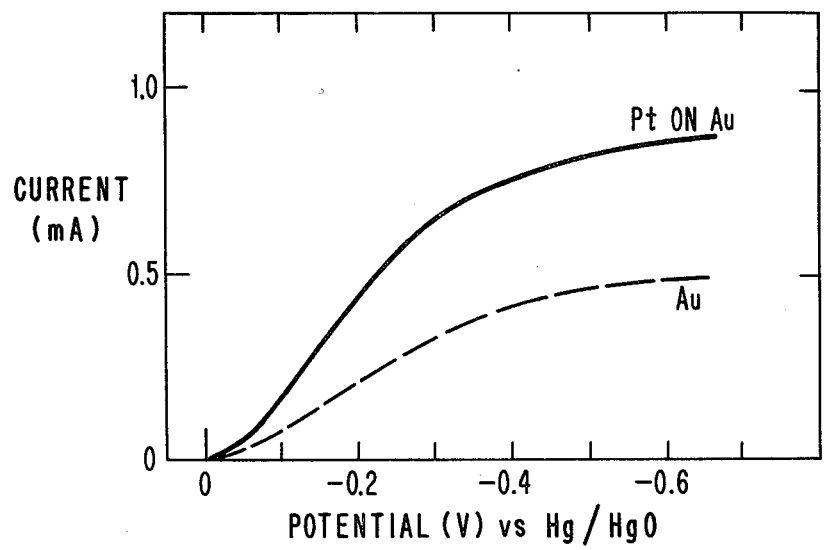
FIG. 5 shows a graph of current vs potential for oxygen reduction in an electrolyte in accordance with this invention.

FIG. 5 shows the current vs potential curve for oxygen reduction in 1 molar sodium hydroxide plus 1/100,000 $Pt(SO_4)_2$ at 2500 rpm dv/dt=15 mv/sec and area=0.2cm$^2$, at 25 degrees C. The upper curve shows the superior performance for Pt on Au and the lower curve shows the results for an electrode of Au without the layer of Pt. While similar results would be obtained for a multilayer film of Pt, the life would be limited due to adsorbed impurities, and also loss of catalyst via dissolution in the electrolyte and loss of surface area via Ostwald ripening.

Metals such as silver and platinum have been found to be useful as catalysts for the electro reduction of oxygen in aqueous electrolytes when deposited on a substrate in a dispersed form. Usually, however, these metals have such a high degree of solubility in the electrolyte that they are lost due to increased particle size (known as Ostwald ripening) total loss of catalyst from the oxygen cathode, and contamination of the anode surface with the cathode catalyst. Applications of this technology which have manifested this problem include petrochemical manufacturing processes such as hydrogenation and dehydrogenation, fuel cells, batteries and industrial electrolysis.

In accordance with this invention, such catalytic metals are used for oxygen reduction with monolayers or submonolayers deposited on a substrate composed of a very noble metal such as gold or an appropriate alloy. Layers of a catalytic metal deposited at an underpotential are much more noble (usually measured to be more than several tenths of a volt more noble) because of their interaction with the substrate.

It is necessary that the deposition of the catalytic metallic monoatomic layer should occur under anodic electrical conditions in the electrochemical system relative to the operating potential of the oxygen operating cathode. Such conditions obtain when the atomic film comprises platinum on gold, silver on gold, or Pd, Ir or Rh on gold. The feasibility of this approach for oxygen catalysis has been demonstrated by experimental work with platinum on gold and silver on gold.

A method of achieving this result is to introduce the cations of the catalytic metal into the electrolyte as an additive to form deposit of a monoatomic layer of the catalytic metal at an underpotential. This can be done while the electrode is operating to provide oxygen reduction, or in the alternative it can be performed in a separate solution prior to application of the system to useful operation. In any event, the catalytic activity of the system as measured by its lifetime, output power and efficiency are enhanced to a marked degree.

For oxygen electrodes of the gas-fed type adapted to high performance operation, the catalytic monolayers deposited at an underpotential are carried on a substrate comprising a stable support which is electronically conductive. Preferably, the substrate comprises gold or its alloys. It is more stable in the sense that as follows: (1) It is refurbishable; (2) the Au crystallites are bonded to the substrates and the UPD species site on top of the upper surface of the substrates and the crystallites of Au acting as substrates are unable to travel along the surface of their substrate in that (a) they are bonded to their substrate of carbon particles, (b) protection by the UPD layer of the catalyst metal, and (3) crystallites of the UPD catalyst metals do not form because the potential is too noble using underpotential deposition as the means of forming the UPD layer, by definition. In addition to greater stability, the approach provides the opportunity to improve the catalytic activity of the catalyst monolayer through electronic changes in its properties brought about by its interaction with the substrate. In addition, submonolayers provide an opportunity for enhancement of the catalytic effect through spillover effects involving the substrate and the partial monolayer. For example, an oxygen molecule has one of its oxygen atoms attached to the substrate of a gold crystallite and the other oxygen atom is attached to an adsorbed adatom of Pt or another UPD catalyst atom deposited on the substrate.

EXAMPLE

The UPD species of Pt, Ir, Ag, Rh, Tl, and Pd are in a concentration of $10^{-5}$ molar to $10^{-4}$ molar in an alkaline electrolyte of 1 to 15 molar solution of NaOH or KOH.

We have discovered that the layer of the catalyst metal on the substrate must be a monolayer in order to achieve the marked advantages of this invention since the bulk or thicker thin films of these metals are not catalytically active towards the oxygen gas reduction or the anodic oxidation of carbonaceous fuels.

Having thus described our invention, what we claim as new, and desire to secure by Letters Patent is:

1. In a fuel cell including a pair of electrodes and an electrolyte between said electrodes housed within a chamber adapted for supplying fuel to said electrodes,
   the improvement comprising provision of a gold substrate serving as the negative electrode of said fuel cell,
   said electrolyte containing a species of ion of a predetermined metal which metal deposits on said gold substrate at an underpotential
   said gold substrate carrying an underpotential layer of said predetermined metal serving as a catalyst metal for the reduction-oxidation reactions of oxygen and other fuels of said fuel cell.

2. A fuel cell in accordance with claim 1 wherein said catalyst metal comprises a monolayer of atoms of said catalyst metal.

3. A fuel cell in accordance with claim 1 wherein said catalyst metal is in solution in said electrolyte in its ionic form and said catalyst metal comprises a monolayer which varies from a continuous to a discontinuous structure as a function of operation with the atoms of the catalyst metal entering and leaving solution during the operation of the system whereby said monolayer is self-cleaning in that impurities selected from organic impurities and other cations are prevented from depositing on the monolayer in that the electrolyte incorporates a supply of ions of said catalyst metal.

4. In a fuel cell in accordance with claim 1, said predetermined metal being selected from the group consisting of Ag, Pt, Pd, Ir, Rh as well as the less noble metals including Tl, Pb and Bi.

5. A fuel cell in accordance with claim 1, wherein said fuel cell employs fuels selected from the group consisting of methanol, formic acid, formaldehyde and hydrogen.

6. In a fuel cell including a pair of electrodes and an electrolyte between said electrodes housed within a chamber adapted for supplying fuel to said electrodes,
   the improvement comprising provision of a gold substrate serving as the negative electrode of said fuel cell,
   said electrolyte containing a species of ion of a predetermined metal which metal deposits on said gold substrate at an underpotential
   said gold substrate carrying a layer of said predetermined metal being selected from the group consisting of Ag, Pt, Pd, Ir, and Rh
   said predetermined metal serving as a catalyst metal for the reduction-oxidation reactions of oxygen and other fuels of said fuel cell.

7. In a fuel cell including a pair of electrodes and an electrolyte between said electrodes housed within a chamber adapted for supplying fuel to said electrodes, the improvement comprising provision of a gold substrate serving as the negative (cathode) electrode of said fuel cell, said electrolyte comprising an alkaline solution containing an ionic solution of platinum, which platinum deposits on said gold substrate at an underpotential, and said gold substrate carrying an under potential layer of said platinum serving as a catalyst metal for the reduction-oxidation reactions of oxygen and other fuels of said fuel cell.

8. A fuel cell in accordance with claim 7 wherein said platinum catalyst metal comprises a monolayer of atoms of said platinum catalyst metal.

9. A fuel cell in accordance with claim 7 wherein said platinum catalyst metal is in solution in said electrolyte in its ionic form and said platinum catalyst metal comprises a monolayer which varies from a continuous to a discontinuous structure as a function of operation, the atoms of said platinum catalyst metal entering and leaving solution in said electrolyte during the operation of the system, whereby said monolayer is self-cleaning in that impurities are selected from organic impurities and other cations are prevented from depositing on said monolayer in that said electrolyte incorporated a supply of ions of said platinum catalyst metal.

10. A fuel cell in accordance with claim 7 wherein said fuel cell employs fuels selected from the group consisting of methanol, formic acid, formaldehyde and hydrogen.

11. A fuel cell in accordance with claim 1 wherein said electrolyte is alkaline, with a pH greater than 7.

12. A fuel cell in accordance with claim 2 wherein said electrolyte is alkaline, with a pH greater than 7.

13. A fuel cell in accordance with claim 3 wherein said electrolyte is alkaline, with a pH greater than 7.

14. A fuel cell in accordance with claim 4 wherein said electrolyte is alkaline, with a pH greater than 7.

15. A fuel cell in accordance with claim 5 wherein said electrolyte is alkaline, with a pH greater than 7.

16. A fuel cell in accordance with claim 6 wherein said electrolyte is alkaline, with a pH greater than 7.

17. A fuel cell in accordance with claim 7 wherein said electrolyte is alkaline, with a pH greater than 7.

18. A fuel cell in accordance with claim 8 wherein said electrolyte is alkaline, with a pH greater than 7.

19. A fuel cell in accordance with claim 9 wherein said electrolyte is alkaline, with a pH greater than 7.

20. A fuel cell in accordance with claim 10 wherein said electrolyte is alkaline, with a pH greater than 7.

* * * * *